Feb. 15, 1938.　　　G. M. BICKNELL　　　2,108,639
AUTOMATIC HEAT CONTROL VALVE FOR INTERNAL COMBUSTION ENGINES
Filed July 30, 1932　　3 Sheets-Sheet 1

GEORGE M. BICKNELL
　　　　INVENTOR

BY
　　　ATTORNEY

Feb. 15, 1938.   G. M. BICKNELL   2,108,639
AUTOMATIC HEAT CONTROL VALVE FOR INTERNAL COMBUSTION ENGINES
Filed July 30, 1932   3 Sheets-Sheet 3

GEORGE M. BICKNELL
INVENTOR

BY F. H. Gibbs
ATTORNEY

Patented Feb. 15, 1938

2,108,639

UNITED STATES PATENT OFFICE 2,108,639

AUTOMATIC HEAT CONTROL VALVE FOR INTERNAL COMBUSTION ENGINES

George M. Bicknell, St. Louis, Mo., assignor to Carter Carburetor Corporation, St. Louis, Mo., a corporation of Delaware Application July 30, 1932, Serial No. 626,858

10 Claims. (Cl. 123—122)

This invention relates to internal combustion engines and more particularly, to the automatic control of heat application to carbureted fuel charges.

In previous constructions of this character wherein the heat controlling valve has been operated by a bi-metallic thermostatic element, great difficulties have been experienced due to the fact that the closing movement of the valve was completed before the maximum temperature was reached, and the heat responsive element was exposed to serious bending strains at high temperatures. Since these temperatures may reach five hundred degrees Fahrenheit or more, bi-metallic thermostats of the ordinary or more economical constructions may become strained beyond their elastic limit for these corresponding temperatures and take a permanent set, thereby destroying the calibration of the element.

It is an object of this invention to provide a thermostatic heat control mechanism constructed and arranged in such a manner that the heat responsive element shall not be under any strains or stresses when the temperature exceeds a predetermined maximum.

It is a further object of this invention to provide a simple, dependable, and economical construction whereby the circulation of exhaust gases about an induction conduit may be varied automatically in accordance with the temperatures and requirements of the engine.

It is a further object of this invention to provide a device whereby compensating adjustments may be conveniently made when necessitated by extreme conditions of temperature or engine requirements.

Other objects and advantages will appear from the accompanying description and drawings, upon reference to which:

Figure 1:
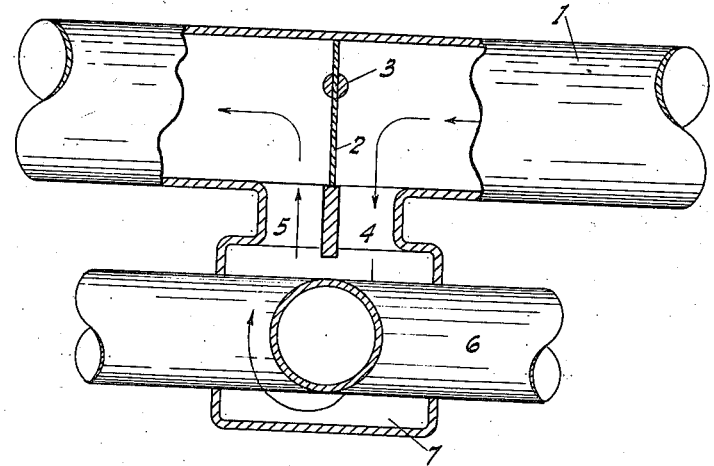
Figure 1 is a diagrammatic view of an exhaust and induction or intake conduit showing the automatically controlled valve in closed position, as it would be when the temperature is low.

The reference numeral 1 indicates a portion of an exhaust manifold, having a plate type valve 2 eccentrically mounted on shaft 3, one end of which is journaled therein, the other being journaled in cover casting 8. Ports and passages as indicated at 4 and 5 permit the circulation of exhaust gases about intake manifold 6 which is jacketed in box 7. It will be understood that a carburetor may be attached to the intake manifold by means of the flange 61 which is provided for that purpose.

Cover casting 8 is attached to the exhaust manifold by means of studs 9 and nuts 10.

It will be seen that cover casting 8 provides a means of support for the valve operating mechanism and also an efficient and convenient means of assembling valve 2.

Figure 2:
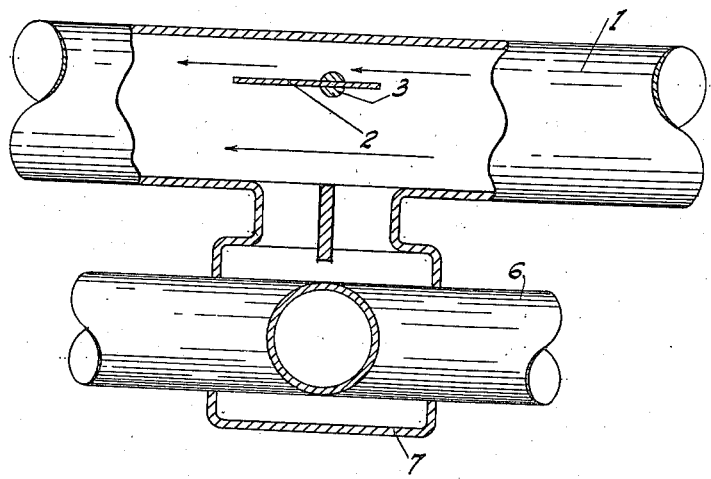
Figure 2 is identical to Figure 1 except that the automatically controlled valve is in an open, or hot, position.
Figure 3:
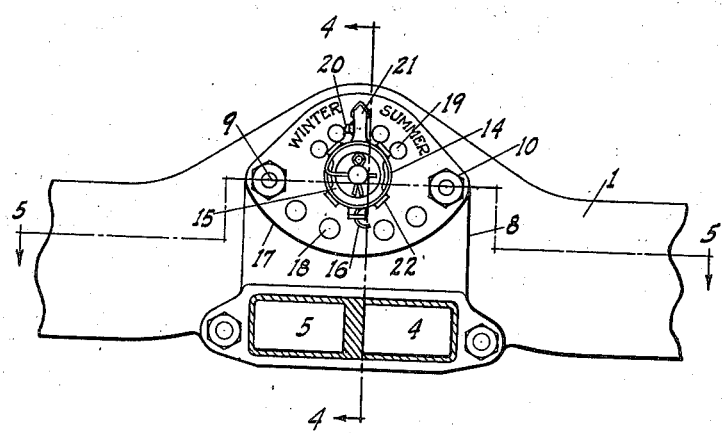
Figure 3 is a front elevation of the valve operating assembly shown attached to a portion of an exhaust manifold.
Figure 4:
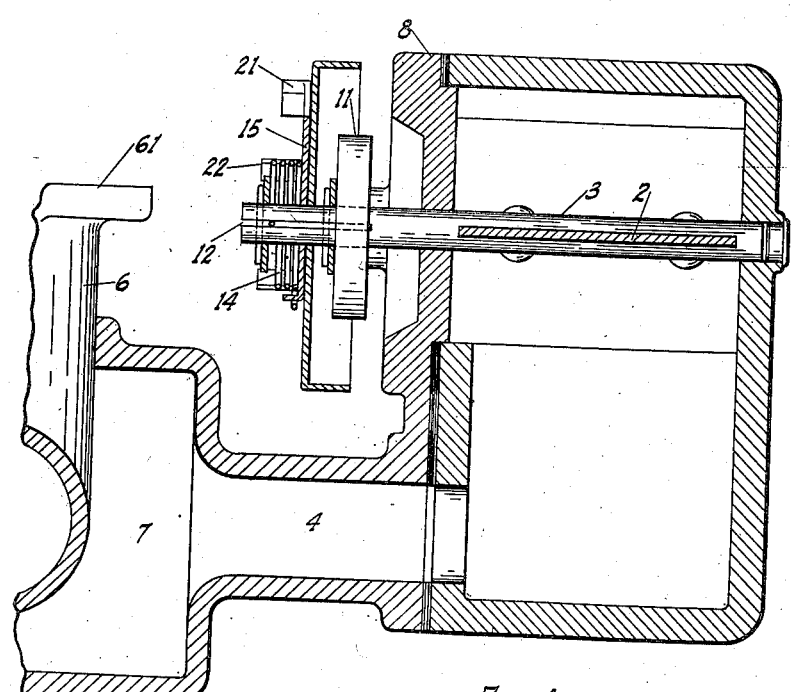
Figure 4 is a sectional view taken on line 4—4 of Figure 3.
Figure 6:
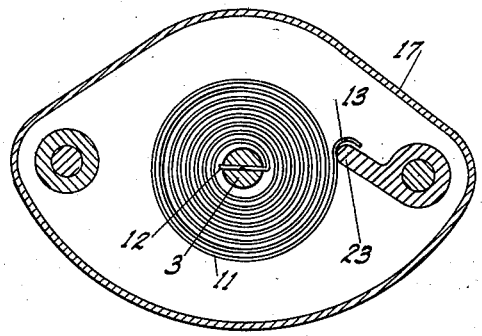
Figure 6 is a sectional view taken on line 6—6 of Figure 5, showing the thermostatic coil.
Figure 5:
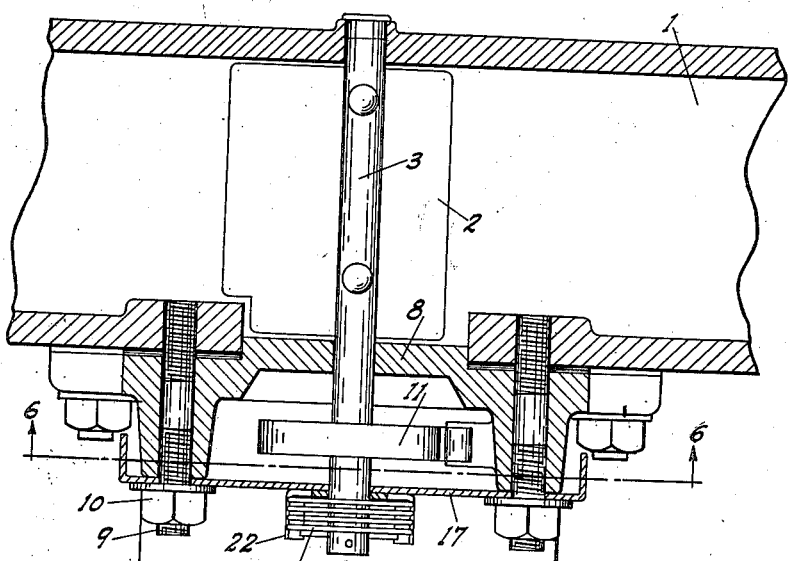
Figure 5 is a sectional view taken on line 5—5 of Figure 3.
Figure 5:
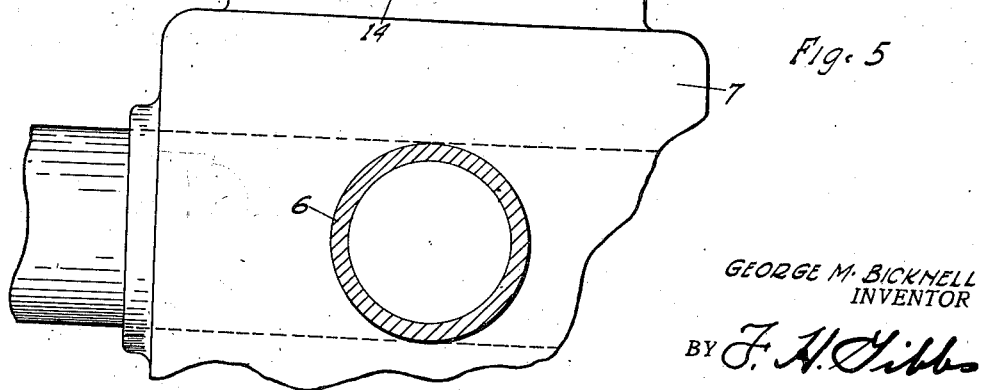

A thermostatic coil 11 of bi-metallic construction wound in such manner that increasing temperatures cause it to contract or coil up, is rigidly mounted at its inner end in slot 12 in valve shaft 3. Referring to Figure 6 it will be seen that upon increased temperature the outer free end 13 of the thermostatic coil is free to move in a counterclockwise direction permitting the spring 14 to rotate shaft 3 in a clock-wise direction, thereby opening valve 2 to the position shown in Figure 2.

Upon decreasing temperatures free end 13 will abut stop 23 and any further uncoiling will tend to rotate valve shaft 3 in a counterclock-wise direction, closing valve 2, and forcing the hot exhaust gases to flow through the heater instead of escaping directly through the conduit 1.

A coiled spring 14 affixed at its inner end in slot 12 and at its outer end to adjusting member 15 at 16, and wound in opposite direction to the thermostatic coil tends normally to rotate valve shaft 3 in a clock-wise direction, and to open valve 2.

Thus it will be seen that as temperature increases the tendency toward counterclock-wise rotation by reason of the thermostatic coil will decrease, and at a predetermined temperature become less than the tendency of the coiled spring 14 toward clock-wise rotation, whereupon the valve will open by reason of the coiled spring.

A shield 17 attached to cover casting 8 by means of studs 9 and nuts 10 forms a protection against tampering. Perforations 18 and 19 permit air circulation and also provide an adjustable locking means for adjustment member 15, which has a projection 20 adapted to releasably engage the perforations. A pointer 21 formed as part of member 15 indicates the setting of the operating mechanism. Lugs 22 formed as part of member 15 provide a means of holding coil spring 14 in alignment.

The operation of the device is as follows:

Upon starting a cold engine in an atmospheric temperature low enough to require the pre-heating of a fuel charge for efficient operation, the valve 2, by reason of the uncoiling tendency at low temperature of thermostatic coil 11, will be in the position shown in Figure 1. It will be understood that the potential power of the thermostatic coil at the assumed temperature is much greater than that of coil spring 14. When the engine is started, and as it continues to run, exhaust gases will pass through port 4 into box 7 where a portion of the heat contained will be absorbed by the induction conduit 6, and will return to the exhaust conduit through port 5.

As the engine warms up heat will be radiated from the exhaust manifold and cover casting 8, causing the outer end of the thermostatic coil to rotate in an anti-clock-wise direction with reference to Figure 6, gradually permitting the spring 14 to open valve 2 and permit the direct escape of the gases from the pipe 1 without passing through the heater.

It will be seen that valve 2 being eccentrically mounted will normally have a tendency to open when subjected to the pressure of exhaust gases, thus overcoming any tendency of spring sticking or binding of the operating parts. This construction is particularly advantageous in view of the fact that when the engine is running at high speeds and discharging a large volume of exhaust gas, the fuel is so efficiently vaporized at the carburetor that the application of additional heat to the combustible mixture becomes less desirable.

By the above described construction and arrangement, it will be noted that whenever the operating temperature of the thermostat is above the minimum temperature at which no further application of heat to the mixture is required, the bi-metallic thermostat is entirely free and unobstructed in its movements, so that bending strains are not applied to the metal when it is hot.

The structure shown may be modified in various respects as will occur to those skilled in the art, and the exclusive use of all such modifications as come within the scope of the appended claims is contemplated.

I claim:

1. In a device of the class described, an intake manifold, an exhaust manifold, a branch passage for conveying exhaust gases from said exhaust manifold to heat said intake manifold, a rotatable valve mounted in said exhaust manifold for directing exhaust gas into said passage, said valve being eccentrically mounted on a shaft, and yielding means constantly urging said valve toward the position to direct gas into said passage.

2. In a device of the class described, an intake manifold, an exhaust manifold, a branch passage for conveying exhaust gases from said exhaust manifold to heat said intake passage, a rotatable valve in said exhaust manifold, said valve being eccentrically mounted on a shaft, and yielding means constantly urging said valve toward the position to direct gas into said passage, said yielding means being displaceable by pressure of the exhaust gases to permit said valve to be moved to a position to direct said gas away from the said passage.

3. In a device of the class described, means forming an exhaust passage, a valve in said passage, spring means normally tending to open said valve, and a bi-metallic thermostat for closing said valve, said thermostat closing said valve against the tension of said spring when the temperature is low, and having one end entirely free to move without interference by said valve or said yielding means whenever a predetermined temperature is exceeded.

4. In a device of the class described, means forming an exhaust passage, a butterfly valve mounted in said passage, a shaft for said valve, a bi-metallic thermostat carried by said shaft for operating it in one direction, and a spring device for operating said shaft in the other direction.

5. In a device of the class described, means forming an exhaust passage, a butterfly valve mounted in said passage, a shaft for said valve, a bi-metallic thermostat carried by said shaft for operating it in one direction, and a spring device for operating said shaft in the other direction, said thermostat being located between said spring device and the exhaust passage.

6. In a device of the class described, means forming an exhaust passage, a butterfly valve mounted in said passage, a shaft for said valve, a bi-metallic thermostat carried by said shaft for operating it in one direction, a spring device for operating said shaft in the other direction, said thermostat being located between said spring device and the exhaust passage, and a sheet metal shield between said thermostat and said spring device.

7. A fuel mixture heater for an internal-combustion engine, comprising an exhaust passage, a heating chamber designed to receive exhaust gases therefrom, a fuel induction passage extending into heat exchange relation to the heating chamber, means operative in one position to deflect the exhaust gases into the chamber, yielding means constantly urging said deflecting means toward one of said positions, and temperature-responsive means operative to urge said deflecting means toward the deflecting position.

8. A fuel mixture heater for an internal-combustion engine, comprising an exhaust passage, a heating chamber communicating therewith, a fuel mixture passage extending into heat exchange relation to the heating chamber, valve means operative in one position to positively deflect the exhaust gases into said chamber and movable upon increased engine speed to a non-deflecting position, yielding means urging said valve means toward one of said positions, and temperature-responsive means operative to yieldingly urge said valve means toward the deflecting position.

9. A fuel mixture heater for an internal combustion engine, comprising an exhaust passage, a heating chamber designed to receive exhaust gases therefrom, a fuel induction passage extending into heat exchange relation to the heating chamber, means operative in one position to deflect the exhaust gases into the chamber and movable upon increased load on the engine to a non-deflecting position, yielding means constantly urging said deflecting means toward one of said positions, and temperature responsive means operative to urge said deflecting means toward the deflecting position.

10. A fuel mixture heater for an internal combustion engine, comprising an exhaust passage, a heating chamber communicating therewith, a fuel mixture passage extending into heat exchange relation to the heating chamber, valve means operative in one position to deflect the exhaust gases into the chamber and movable upon increased engine speed to a non-deflecting position, yielding means urging said valve means toward one of said positions, and temperature responsive means operative to yieldingly urge said valve means toward the deflecting position.

GEORGE M. BICKNELL.